United States Patent
Jang et al.

(10) Patent No.: US 12,294,108 B2
(45) Date of Patent: May 6, 2025

(54) BATTERY MODULE AND BATTERY PACK WITH IMPROVED SAFETY

(71) Applicant: LG ENERGY SOLUTION, LTD., Seoul (KR)

(72) Inventors: Sung-Hwan Jang, Daejeon (KR); Kwang-Mo Kim, Daejeon (KR); Myung-Ki Park, Daejeon (KR); Jun-Yeob Seong, Daejeon (KR); Hye-Mi Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/279,025

(22) PCT Filed: Oct. 13, 2022

(86) PCT No.: PCT/KR2022/015517
§ 371 (c)(1),
(2) Date: Aug. 25, 2023

(87) PCT Pub. No.: WO2023/068657
PCT Pub. Date: Apr. 27, 2023

(65) Prior Publication Data
US 2023/0411781 A1 Dec. 21, 2023

(30) Foreign Application Priority Data

Oct. 18, 2021 (KR) ........................ 10-2021-0138851

(51) Int. Cl.
*H01M 50/367* (2021.01)
*H01M 50/209* (2021.01)
(Continued)

(52) U.S. Cl.
CPC ....... *H01M 50/367* (2021.01); *H01M 50/209* (2021.01); *H01M 50/249* (2021.01);
(Continued)

(58) Field of Classification Search
CPC .. H01M 50/209; H01M 50/249; H01M 50/35; H01M 50/358; H01M 50/367
See application file for complete search history.

(56) References Cited

U.S. PATENT DOCUMENTS

2012/0288738 A1* 11/2012 Yasui .................. H01M 50/262
429/82
2014/0205878 A1* 7/2014 Ohgitani ............. H01M 50/358
429/82
(Continued)

FOREIGN PATENT DOCUMENTS

JP 2010-272264 A 12/2010
JP 2016-189290 A 11/2016
(Continued)

OTHER PUBLICATIONS

International Search Report (PCT/ISA/210) Issued in PCT/KR2022/015517, dated Jan. 30, 2023.

*Primary Examiner* — Jonathan G Jelsma
(74) *Attorney, Agent, or Firm* — Birch, Stewart, Kolasch & Birch, LLP

(57) ABSTRACT

A battery module ensures safety when a thermal event occurs in the battery module. A battery module includes a cell assembly including one or more battery cells, a module case having an inner space in which the cell assembly is accommodated, the module case including a venting hole through which venting gas generated from the cell assembly is discharged, and a venting unit attached to an outer side of the module case, and configured to allow venting gas discharged from the venting hole to be introduced and discharged to an outside and configured to switch a flow direction of the venting gas to an opposite direction.

11 Claims, 13 Drawing Sheets

(51) Int. Cl.
*H01M 50/249* (2021.01)
*H01M 50/35* (2021.01)
*H01M 50/358* (2021.01)

(52) U.S. Cl.
CPC ......... *H01M 50/35* (2021.01); *H01M 50/358* (2021.01); *H01M 2220/20* (2013.01)

(56) References Cited

U.S. PATENT DOCUMENTS

| | | | |
|---|---|---|---|
| 2016/0293918 A1 | 10/2016 | Fujimoto | |
| 2017/0237055 A1 | 8/2017 | Shimizu et al. | |
| 2018/0108892 A1 | 4/2018 | Kim et al. | |
| 2020/0067045 A1* | 2/2020 | Takano | H01M 50/342 |
| 2021/0066690 A1 | 3/2021 | Gondoh | |
| 2022/0115737 A1 | 4/2022 | Shin et al. | |
| 2023/0052417 A1 | 2/2023 | Shin et al. | |
| 2023/0291069 A1* | 9/2023 | Murkute | H01M 10/613 429/53 |

FOREIGN PATENT DOCUMENTS

| | | | | |
|---|---|---|---|---|
| JP | 2018-73561 | A | 5/2018 | |
| JP | 2018-527704 | A | 9/2018 | |
| JP | 6574987 | B2 | 9/2019 | |
| JP | 6596874 | B2 | 10/2019 | |
| KR | 10-2017-0044473 | A | 4/2017 | |
| KR | 10-1799238 | B1 | 11/2017 | |
| KR | 10-2030726 | B1 | 10/2019 | |
| KR | 10-2061872 | B1 | 1/2020 | |
| KR | 2061872 | B1 * | 1/2020 | B60L 50/66 |
| KR | 10-2021-0004189 | A | 1/2021 | |
| KR | 2021004189 | A * | 1/2021 | A62C 3/16 |
| KR | 10-2256596 | B1 | 6/2021 | |
| KR | 2256596 | B1 * | 6/2021 | H01M 10/613 |
| KR | 10-2021-0122559 | A | 10/2021 | |
| KR | 2021122559 | A * | 10/2021 | A62C 2/06 |
| WO | WO 2019/176415 | A1 | 9/2019 | |
| WO | WO 2020/166501 | A1 | 8/2020 | |

* cited by examiner

BATTERY MODULE AND BATTERY PACK WITH IMPROVED SAFETY

TECHNICAL FIELD

The present application claims priority to Korean Patent Application No. 10-2021-0138851 filed on Oct. 18, 2021 in the Republic of Korea, the disclosures of which are incorporated herein by reference.

The present disclosure relates to a battery, and more particularly, to a battery module and a battery pack with improved safety and a vehicle including the same.

BACKGROUND ART

As the demand for portable electronic products such as laptops, smartphones, tablet PCs, and smart watches has recently rapidly increased and the commercialization of robots, electric vehicles, etc. has begun in earnest, research on high-performance secondary batteries capable of repeated charging/discharging has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus, have advantages of free charge/discharge, very low self-discharge rate, and high energy density.

A lithium secondary battery mainly uses a lithium-based oxide and a carbon material as a positive electrode active material and a negative electrode active material, respectively. A lithium secondary battery includes an electrode assembly in which a positive electrode plate and a negative electrode plate coated with a positive electrode active material and a negative electrode active material are located with a separator therebetween, and a casing in which the electrode assembly is air-tightly accommodated with an electrolyte, that is, a battery case.

In general, according to a shape of a casing, lithium secondary batteries may be classified into can-type secondary batteries in which an electrode assembly is received in a metal can, and pouch-type secondary batteries in which an electrode assembly is received in a pouch of an aluminum laminate sheet.

Recently, secondary batteries have been widely used for driving or energy storage not only in small devices such as portable electronic devices but also in medium and large-sized devices such as electric vehicles and energy storage systems (ESSs). A plurality of secondary batteries may be electrically connected to each other and accommodated together in a module case to constitute one battery module. A plurality of battery modules may be connected to each other to constitute one battery pack.

However, when a plurality of battery modules are included in a battery pack, the battery pack may be vulnerable to a thermal chain reaction between the battery modules. For example, when an event such as thermal runaway occurs in one battery module, it is necessary to suppress propagation of the thermal runaway to other battery modules. When the propagation of thermal runaway between battery modules is not suppressed, an event occurring in a specific module may cause a chain reaction in several battery modules, which may cause an explosion or fire.

In particular, when an event such as thermal runaway occurs in any one battery module, gas or flame may be discharged to the outside. In this case, when the discharge of gas or flame is not appropriately controlled, the gas or flame may be discharged toward other battery modules, which may cause a thermal chain reaction of the other battery modules. Furthermore, when a thermal event occurs in a battery module, a large amount of combustible gas and factors that may cause firing such as a spark, electrode discharged material, and carbide may be generated. When the factors that may cause firing are discharged to the outside during gas discharge, the factors may meet oxygen and cause a fire. In addition, when external oxygen is introduced into the battery module where the thermal event occurs, a fire in the battery module may occur or spread.

DISCLOSURE

Technical Problem

The present disclosure is designed to solve the problems of the related art, and therefore the present disclosure is directed to providing a battery module having an improved structure to ensure safety when a thermal event occurs in the battery module, and a battery pack and a vehicle including the battery module.

However, the technical purpose to be solved by the present disclosure is not limited to the above, and other objects not mentioned herein will be clearly understood by one of ordinary skill in the art from the following disclosure.

Technical Solution

In one aspect of the present disclosure, there is provided a battery module including a cell assembly including one or more battery cells, a module case having an inner space in which the cell assembly is accommodated, the module case including a venting hole through which venting gas generated from the cell assembly is discharged, and a venting unit attached to an outer side of the module case, and configured to allow venting gas discharged from the venting hole to be introduced and discharged to an outside and configured to switch a flow direction of the venting gas to an opposite direction.

Here, the venting unit may be configured to define a venting channel together with an outer surface of the module case.

Also, the venting unit may include a main body having a plate shape and a bent portion bent from an edge of the main body toward the module case.

Also, the venting unit may include a protrusion path that protrudes from an inner surface toward an outer surface of the module case to define a flow path of the venting gas.

Also, the protrusion path may include an end that contacts the outer surface of the module case.

Also, at least a portion of the protrusion path may be bent in a curved shape.

Also, the protrusion path may include a spiral part in which at least a portion is bent in a spiral shape.

Also, the protrusion path may include two spiral parts in which at least a portion is inserted.

Also, the protrusion path may further include a straight part.

Also, the venting unit may be located on a side surface of the module case, wherein the protrusion path is configured so that the venting gas at least partially flows downward.

Also, the protrusion path may be configured to open and close a venting path.

In another aspect of the present disclosure, there is also provided a battery pack including the battery module according to the present disclosure.

In another aspect of the present disclosure, there is also provided a battery pack including one or more battery modules, a pack housing having an inner space in which the one or more battery modules are accommodated, the pack housing including a pack hole, and a venting unit mounted on the pack housing, including a venting channel through which venting gas discharged from the pack hole is introduced and discharged to an outside, and configured to switch a flow direction of the venting gas in the venting channel to an opposite direction.

According to another aspect of the present disclosure, there is provided a vehicle including the battery module according to the present disclosure.

Advantageous Effects

According to an aspect of the present disclosure, there may be provided a path through which, when a thermal event occurs in a specific battery module or battery pack, gas and heat may be rapidly discharged.

Also, according to an aspect of the present disclosure, because a discharge path of venting gas is increased, a flame or spark, an electrode discharged material, and a carbide having high linearity may be effectively prevented from being discharged to the outside.

In particular, in the present disclosure, because a material that may cause firing such as a spark or an electrode discharged material is prevented from meeting oxygen outside a module, a fire may be prevented from occurring outside the battery module.

Also, according to an aspect of the present disclosure, because, when a flame occurs in a battery module, the flame is prevented from being discharged to the outside of the battery module as much as possible, a thermal event may be prevented from spreading to other battery modules.

In addition, according to an aspect of the present disclosure, because oxygen outside a battery module is prevented from being introduced into the battery module, a fire may be prevented from occurring or growing in the battery module.

Also, according to an aspect of the present disclosure, with a simple structure, venting of a battery module may be controlled and propagation of heat/flame between battery modules may be prevented.

The present disclosure may have various other effects, which will be described in each embodiment, or descriptions of effects that may be easily inferred by one of ordinary skill in the art will be omitted.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the present disclosure, so it should be understood that other equivalents and modifications could be made thereto without departing from the scope of the present disclosure.

Figure 1:
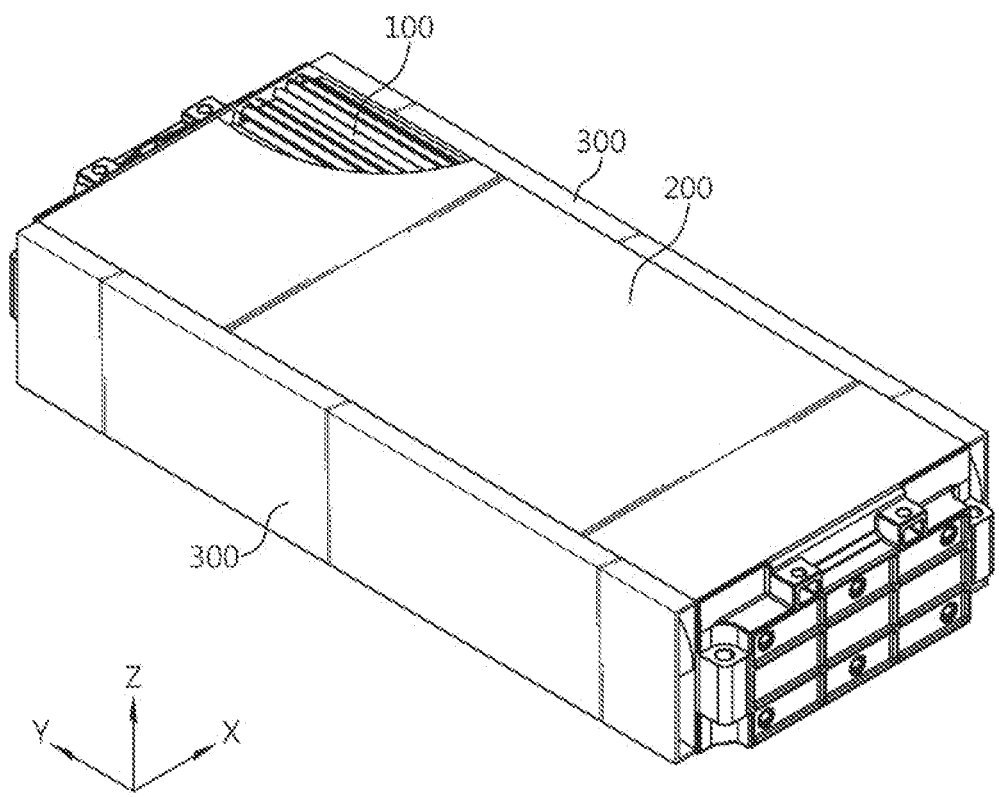
FIG. 1 is a combined perspective view schematically illustrating elements of a battery module, according to an embodiment of the present disclosure.
Figure 2:
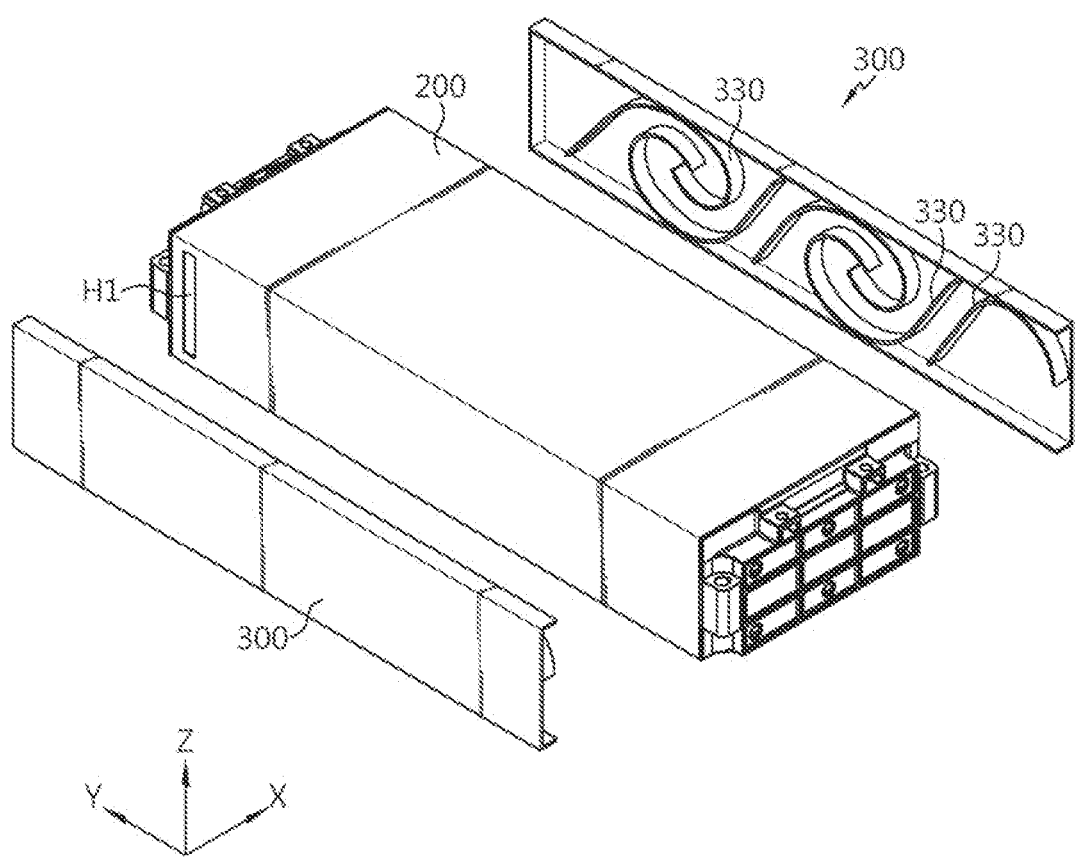
FIG. 2 is an exploded perspective view illustrating some elements of FIG. 1.

FIG. 1 is a combined perspective view schematically illustrating elements of a battery module, according to an embodiment of the present disclosure. FIG. 2 is an exploded perspective view illustrating some elements of FIG. 1.

Referring to FIGS. 1 and 2, a battery module according to the present disclosure includes a cell assembly 100, a module case 200, and a venting unit 300.

The cell assembly 100 may include one or more battery cells. Each battery cell may refer to a secondary battery. The secondary battery may include an electrode assembly, an electrolyte, and a battery case. In particular, the battery cell provided in the cell assembly 100 may be a pouch-type secondary battery. However, another type of secondary battery, for example, a cylindrical battery or a prismatic battery, may be applied to the cell assembly 100.

A plurality of secondary batteries may be stacked on each other to form the cell assembly 100. For example, the plurality of secondary batteries may be stacked by being arranged in a horizontal direction (X-axis direction) while erected in a vertical direction (Z-axis direction). Each battery cell may include an electrode lead, and the electrode lead may be located at both ends or at one end of the battery cell. A secondary battery in which the electrode lead protrudes in both directions may be referred to as a bidirectional cell, and a secondary battery in which the electrode lead protrudes in one direction may be referred to as a unidirectional cell. However, the present disclosure is not limited to a specific type or shape of a secondary battery, and various types of secondary batteries known at the time of filing the present application may be applied to the cell assembly 100.

The module case 200 may have an empty inner space in which the cell assembly 100 is accommodated. For example, the module case 200 may include an upper plate, a lower plate, a left plate, a right plate, a front plate, and a rear plate to define the inner space. At least two of the upper plate, the lower plate, the left plate, the right plate, the front plate, and the rear plate may be integrally formed with each other. For example, the upper plate, the lower plate, the left plate, and the right plate may be integrally formed with each other. In this case, the integrated case may have a tubular shape, and may be referred to as a mono frame. In another example, the left plate, the right plate, the lower plate may be integrally formed with each other. In this case, the integrated case may be referred to as a U-frame due to its shape. In addition, the module case 200 may be configured in any of various other shapes.

A venting hole H1 may be formed on at least one side of the module case 200, as shown in FIG. 2. For example, the venting hole H1 may be formed in each of the left plate and the right plate of the module case 200. The venting hole H1 may be configured so that, when venting gas is generated and ejected from the cell assembly 100 accommodated in the inner space, the generated venting gas may be discharged through the venting hole H1 to an outer space of the module case 200. For example, the venting hole H1 may be completely open to pass through the module case 200. Alternatively, the venting hole H1 may not be completely open, but may be configured so that the venting hole H1 is closed in a normal state and may be opened according to a change in pressure or temperature. Also, the venting hole H1 may extend long in one direction. For example, as shown in FIG. 2, the venting hole H1 may extend long in the vertical direction. Also, the venting hole H1 may be formed in side surfaces, in particular, a left surface and a right surface, of the module case 200. However, the venting hole H1 may be formed in other portions of the module case 200, for example, a top surface, a bottom surface, a front surface/or a rear surface. In addition, the venting hole H1 formed in the module case 200 may be formed in any of various other ways.

The venting unit 300 may be provided outside the module case 200. In particular, the venting unit 300 may be attached to a portion of the module case 200 where the venting hole H1 is formed. For example, as shown in FIG. 2, when the venting hole H1 is formed in the left surface of the module case 200, the venting unit 300 may be attached to the left surface of the module case 200. Also, although not shown, the venting hole H1 may also be formed in the right surface of the module case 200. In this case, the venting unit 300 may also be attached to the right surface of the module case 200, as shown in FIG. 2.

The venting unit 300 may be configured so that venting gas discharged from the venting hole H1 of the module case 200 is introduced and discharged to the outside. In particular, the venting unit 300 may define an empty inner space so that venting gas flows in the defined inner space. In this case, the inner space of the venting unit 300 that is a space for guiding venting gas may be referred to as a venting channel. That is, the venting unit 300 may include the venting channel through which venting gas may flow.

In particular, the venting unit 300 may be configured so that, when venting gas flows in the venting unit 300, a flow direction of the venting gas is switched to the opposite direction, which will be described in more detail with further reference to FIG. 3.

Figure 3:
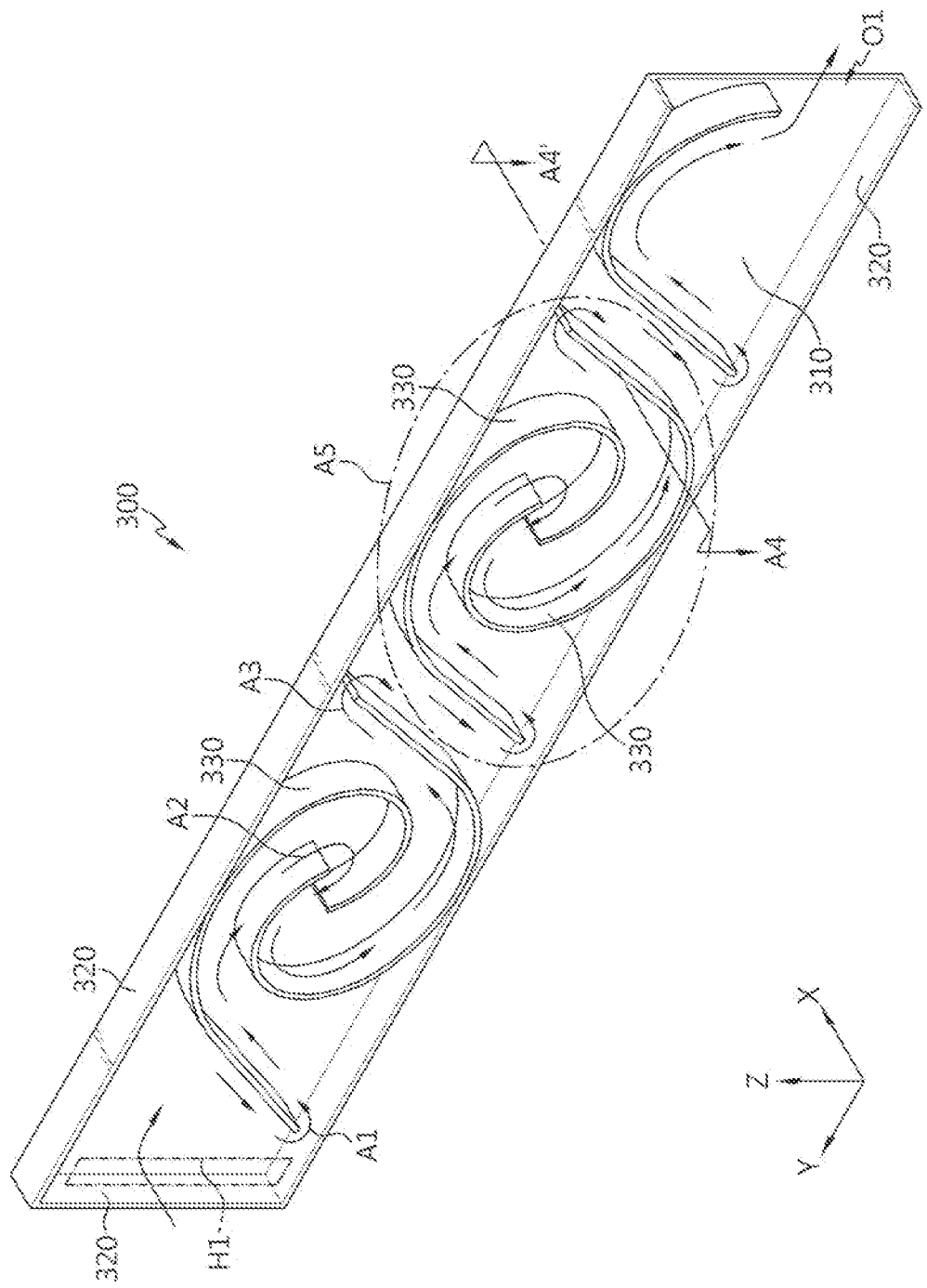
FIG. 3 is a view schematically illustrating a flow direction of venting gas in an inner space of a venting unit, according to an embodiment of the present disclosure.

FIG. 3 is a view schematically illustrating a flow direction of venting gas in an inner space of the venting unit 300, according to an embodiment of the present disclosure. However, in FIG. 3, for convenience of explanation, a position of the venting hole H1 formed in the module case 200 is marked by a dashed line.

Referring to FIG. 3, the venting unit 300 may include at least one portion where, when venting gas flows in an inner space, that is, a venting channel, a flow direction of the venting gas is switched to the opposite direction. For example, venting gas in the venting unit 300 may flow as marked by an arrow of FIG. 3. In this case, a flow direction of the venting gas may be switched to the opposite direction in multiple portions A1, A2, and A3.

In particular, in the portion A2, venting gas is switched and flows in a direction opposite to an overall flow direction. The overall flow direction of venting gas may be a direction (−Y axis direction) from the venting hole H1 toward an outlet O1. In the portion A2, a flow direction of venting gas may be the opposite direction, that is, a direction from the outlet O1 toward the venting hole H1. Accordingly, in the portion A2, a flow direction of venting gas may be switched from the −Y axis direction to a +Y axis direction by about 180°.

According to this configuration of the present disclosure, a flow path of venting gas may be long in the inner space of the venting unit 300. Accordingly, when venting gas introduced into the venting unit 300 is discharged to the outside of the venting unit 300, a temperature of the venting gas may be lowered. In addition, according to the configuration, the probability that a material that may cause a fire such as a flame or spark, or active material particles included in the venting gas is discharged to the outside of the venting unit 300 may be reduced. Accordingly, a fire in another element located outside the battery module, for example, another battery module, may be prevented. Hence, in this case, propagation of thermal runaway between multiple battery modules may be more effectively prevented.

Also, according to the embodiment, a path through which oxygen present outside the venting unit 300 is introduced into the module case 200 through the venting unit 300 may be long. Accordingly, in this case, when oxygen is introduced into a battery module in which thermal runaway or the like occurs, a fire may be prevented from occurring or growing in the battery module.

Figure 5:
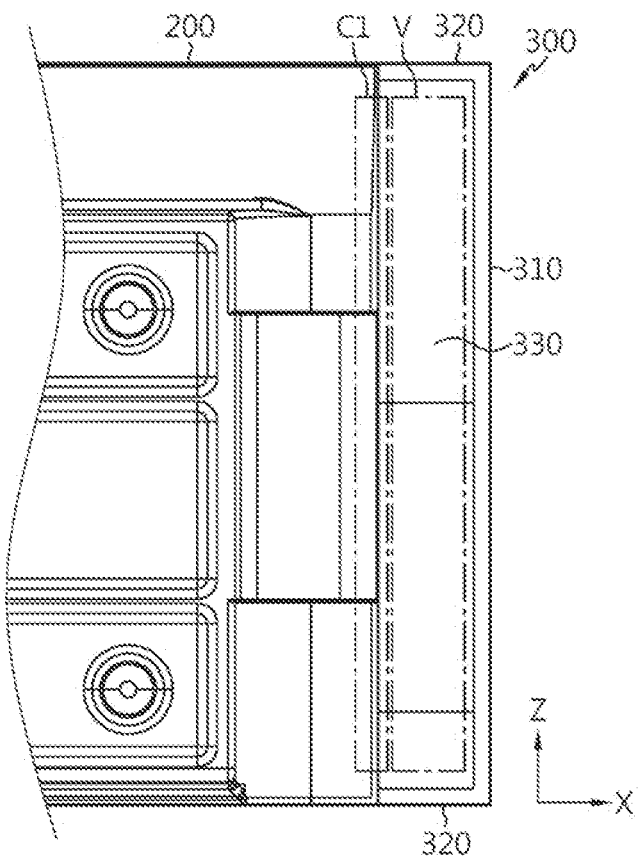
FIG. 5 is a view illustrating a state where elements of FIG. 4 are combined with each other.
Figure 6:
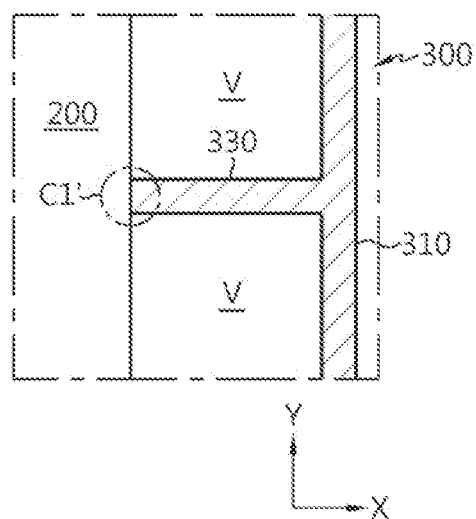
FIG. 6 is a cross-sectional view schematically illustrating some elements of a battery module, according to an embodiment of the present disclosure.

The venting unit 300 may be configured to define a venting channel along with an outer surface of the module case 200, which will be described in more detail further with reference to FIGS. 4 to 6.

Figure 4:
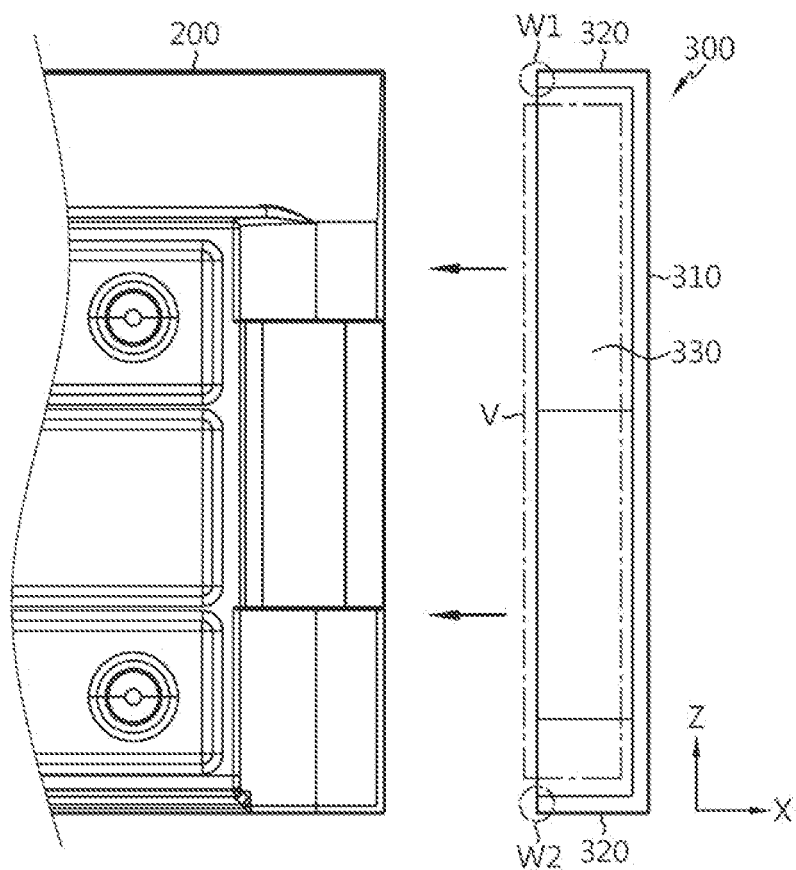
FIG. 4 is a front view illustrating some separated elements of a battery module, according to an embodiment of the present disclosure.

FIG. 4 is a front view illustrating some separated elements of a battery module, according to an embodiment of the present disclosure. For example, FIG. 4 is a view schematically illustrating a state where the right venting unit 300 is separated from the module case 200, in the battery module of FIG. 1. FIG. 5 is a view illustrating a state where elements of FIG. 4 are combined with each other. Also, FIG. 6 is a cross-sectional view schematically illustrating some elements of a battery module, according to an embodiment of the present disclosure. For example, FIG. 6 is a cross-sectional view taken along line A4-A4' of FIG. 3.

Referring to FIGS. 1 to 6, the venting unit 300 may be configured to define a venting channel along with the module case 200. In a more specific example, referring to FIG. 4, the right venting unit 300 may be attached to a right surface of the module case 200, as marked by an arrow. In this case, a venting channel V may be formed in an inner space of the venting unit 300.

The venting channel V may not be completely formed only by the venting unit 300, but may be completely formed when the venting unit 300 is attached to the module case 200. That is, as shown in FIG. 4, before the venting unit 300 is attached to an outer surface of the module case 200, a side surface of the venting channel V, for example, a left surface of the venting channel V, may remain open. As shown in FIG. 5, when the venting unit 300 is attached to the right outer surface of the module case 200, the open left surface of the venting channel V may be closed by the right outer surface of the module case 200. In other words, in a configuration of FIG. 5, an upper portion, a lower portion, and a right portion of the venting channel V may be defined by the venting unit 300, and a left portion of the venting channel V may be defined by the module case 200.

According to this configuration of the present disclosure, because a structure of the venting unit 300 is simplified, the venting unit 300 may be easily manufactured. In particular, a structure for defining a flow path of venting gas may exist in the inner space of the venting unit 300. In this case, when a side surface of the venting unit 300 is open, this structure may more easily provided in the venting unit 300. Also, according to the embodiment, the battery module may be more easily manufactured.

The venting unit 300 may include a main body 310 and a bent portion 320. The main body 310 may have a plate shape. The bent portion 320 may be bent from an edge of the main body 310 toward the module case 200. In particular, the bent portion 320 may be integrally formed with the main body 310.

In a more specific example, the main body 310 may have a quadrangular plate shape. The bent portion 320 may be formed at three edges from among four edges of the main body 310. For example, as shown in FIGS. 3 and 4, the bent portion 320 may be formed at an upper edge, a lower edge, and a rear edge of the main body 310. Because the bent portion 320 is not formed at a front edge of the main body 310, the outlet O1 for discharging venting gas may be formed.

In this embodiment, a side surface, an upper portion, and a lower portion of the venting channel V may be defined by the main body 310 and the bent portion 320 of the venting unit 300. For example, referring to a configuration of FIG. 4, a right surface of the venting channel V may be defined by the main body 310, and an upper portion and a lower portion of the venting channel V may be defined by the upper bent portion 320 and the lower bent portion 320. A rear side of the venting channel V may be defined by the rear bent portion 320 of the venting unit 300.

In FIG. 4, outer ends W1 and W2 (left ends) of the upper bent portion 320 and the lower bent portion 320 of the venting unit 320 may be attached to the outer surface of the module case 200. Also, the rear bent portion 320 of the venting unit 300 may be attached to the outer surface of the module case 200. An attached portion between the module case 200 and each bent portion 320 of the venting unit 300 may be sealed so that venting gas does not leak out. For example, an end of each bent portion 320 of the venting unit 300 may be laser welded to the outer surface of the module case 200. Also, the venting unit 300 and the module case 200 may be coupled to each other in various other ways.

As such, the venting channel V may be formed by the venting unit 300 and the outer surface of the module case 200. Venting gas discharged from the venting hole H1 may flow in the venting channel V as marked by an arrow in FIG. 3 and may be discharged to the outlet O1.

According to this configuration of the present disclosure, a configuration for guiding venting gas in the battery module may have a simple structure and may be provided by using an easy assembly method. In particular, according to this embodiment of the present disclosure, when only the venting hole H1 is formed in the module case 200, most of conventional battery module elements may be used. Accordingly, in order to implement the present disclosure, it is not necessary to significantly change or complicate a design or a manufacturing method of the module case 200 or internal elements of the module case 200. Hence, the battery module according to the present disclosure may be easily manufactured.

Also, the venting unit 300 may include a protrusion path 330.

The protrusion path 330 may protrude from an inner surface of the venting unit 300 toward the outer surface of the module case 200. For example, referring to a configuration of FIGS. 3 to 6, the protrusion path 330 may protrude from a left surface that is an inner surface of the main body 310 in a left direction (−X axis direction) toward the module case 200.

In particular, a side surface of the venting channel V of the venting unit 300 may be open, and the protrusion path 330 may protrude from the inner surface of the venting unit 300 toward the open side surface. For example, according to an embodiment of FIGS. 4 to 6, a left surface of the venting channel V may be open. In this case, the protrusion path 330 may protrude from the left surface of the main body 310 that is the inner surface of the venting unit 300 toward a left side that is an open portion.

The protrusion path 330 may be configured to define a flow path of venting gas in the venting channel. That is, the protrusion path 330 may be a structure for determining a flow direction of venting gas in which venting gas should flow in the inner space of the venting unit 300. For example, a flow direction of venting gas in the venting unit 300 may be determined by the protrusion path 330 as shown in FIG. 3.

An end of the protrusion path 330 may contact the outer surface of the module case 200. For example, when the venting unit 300 is attached to the right surface of the module case 200 as shown in a configuration of FIGS. 5 and 6, a left end C1 or C1' of the protrusion path 330 may contact the right surface of the module case 200.

According to this embodiment of the present disclosure, a configuration for guiding the flow of venting gas by the protrusion path 330 may be more reliably implemented. That is, in the embodiment, there may be no gap between an outer end (left end) of the protrusion path 330 and the module case 200. Accordingly, in this case, venting gas may flow only in an intended direction. That is, a portion where venting gas is guided to flow in the venting unit 300 may be a space between the protrusion paths 330 or a space between the protrusion path 330 and the bent portion 320. Hence, in the embodiment, venting gas may be prevented from leaking out through a gap between an end of the protrusion path 330 and the module case 200. That is, in the embodiment, venting gas may be prevented from linearly flowing ignoring the protrusion path 330 and being discharged to the outlet O1.

The protrusion path 330 may have a plate shape extending long in one direction as shown in FIG. 3. In particular, a length of the protrusion path 330 in an extending direction may be greater than a length of the protrusion path 330 in a width direction. In this case, the protrusion path 330 may be formed in a stripe or band shape.

The venting unit 300 may be configured so that a flow direction of venting gas is formed along an extending direction of the protrusion path 330 that extends long. Moreover, the protrusion path 330 may be formed so that an edge of a plate that extends long is attached to the main body 310. For example, in a configuration of FIGS. 3 to 6, the protrusion path 330 may have a plate shape having two wide surfaces and extending long in one direction, and a right edge portion may be attached to the main body 310. In this case, the right edge portion of the protrusion path 330 and the main body 310 may be coupled to each other by using any of various methods such as welding or adhesion. Alternatively, the protrusion path 330 may be integrally manufactured with the main body 310 from the beginning. When the venting unit 300 is attached to the module case 200, a left edge portion (e.g., C1 or C1') of the protrusion path 330 may contact the outer surface of the module case 200 as shown in FIGS. 5 and 6. Accordingly, venting gas may flow along a wide surface of the protrusion path 330 that has a long plate shape.

Figure 7:
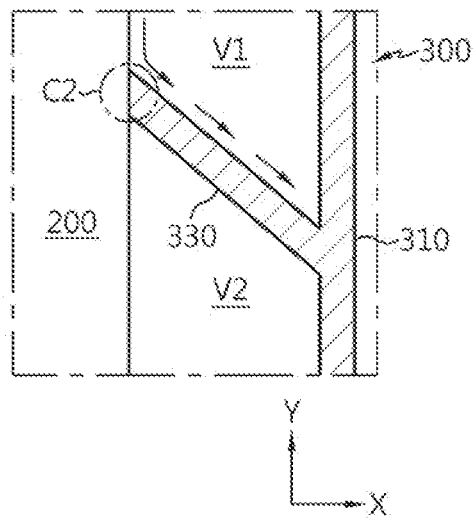
FIG. 7 is a cross-sectional view schematically illustrating some elements of a battery module, according to another embodiment of the present disclosure.

FIG. 7 is a cross-sectional view schematically illustrating some elements of a battery module, according to another embodiment of the present disclosure. For example, FIG. 7 may be another example of a cross-sectional view taken along line A4-A4' of FIG. 3. When various embodiments of the present disclosure including the present embodiment are described, for parts to which descriptions of the above embodiments are equally or similarly applicable, descriptions thereof are omitted, and different parts are mainly described.

Referring to FIG. 7, the protrusion path 330 may protrude from an inner surface of the main body 310 toward the module case 200 while being inclined at a certain angle. That is, the protrusion path 330 may be inclined at a certain angle with respect to a surface of the main body 310 rather than in a vertical direction. Because the protrusion path 330 protrudes while being inclined, the protrusion path 330 may also contact an outer surface of the module case 200 while being inclined at a certain angle, not in the vertical direction.

In particular, the protrusion path 330 may protrude toward the module case 200 and may be inclined toward a side where venting gas is introduced toward an end. Moreover, the protrusion path 330 may be inclined toward the venting hole H1 toward the end. In more detail, in FIG. 7, the venting hole H1 may be located in the +Y axis direction more than the protrusion path 330. The outlet O1 may be located in the −Y axis direction more than the protrusion path 330. That is, for the protrusion path 330 of FIG. 7, venting gas may be introduced in the +Y axis direction.

In this case, the protrusion path 330 may be inclined in the +Y axis direction toward the left (−X axis direction) that is toward the module case 200. A portion C2 that is a left end of the protrusion path 330 may contact a right surface of the module case 200. In this case, a venting channel may be divided into spaces V1 and V2 by the protrusion path 330. When venting gas is introduced into the venting channel through the venting hole H1, the venting gas may be first introduced into the space V1. The venting gas introduced into the space V1 may move to the space V2 through a portion where the protrusion path 330 does not exist.

In this case, according to the embodiment, venting gas may be more effectively prevented from leaking out through a gap C2 between the protrusion path 330 and the module case 200. That is, when venting gas is first introduced into the space V1, the venting gas may move in a rightward direction (+X axis direction) along an inclined surface of a rear surface (+Y axis direction surface) of the protrusion path 330. In this case, a right end of the protrusion path 330 may be integrally formed with the main body 310. Accordingly, when venting gas moves form the space V1 to the space V2, the venting gas may move only in a designed direction and may not leak out through the gap C2. Hence, in this case, the venting gas may be more reliably prevented from unintentionally flowing in the venting unit 300, in particular, linearly flowing.

Figure 8:
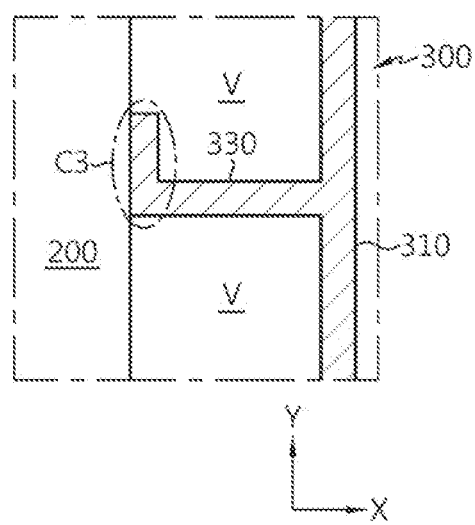
FIG. 8 is a cross-sectional view schematically illustrating some elements of a battery module, according to still another embodiment of the present disclosure.

FIG. 8 is a cross-sectional view schematically illustrating some elements of a battery module, according to still another embodiment of the present disclosure. For example, FIG. 8 may be a view illustrating still another example of a cross-sectional view taken along line A4-A4' of FIG. 3.

Referring to FIG. 8, the protrusion path 330 may protrude from an inner surface of the venting unit 300, that is, an inner surface of the main body 310, toward the module case 200, and may have an end C3 bent along a surface of the module case 200. That is, an end of the protrusion path 330 may be bent, and thus, the protrusion path 330 may contact an outer surface of the module case 200 with an area larger than an edge.

According to this embodiment of the present disclosure, sealing performance between the end of the protrusion path 330 and the module case 200 may be further improved. Accordingly, venting gas or the like may be more effectively prevented from leaking out through a gap between the end of the protrusion path 330 and the module case 200. Hence, in this case, a configuration for guiding venting gas by the protrusion path 330 may be further improved.

At least a portion of the protrusion path 330 may be bent in a curved shape, which will be described in more detail with reference to FIG. 9.

Figure 9:
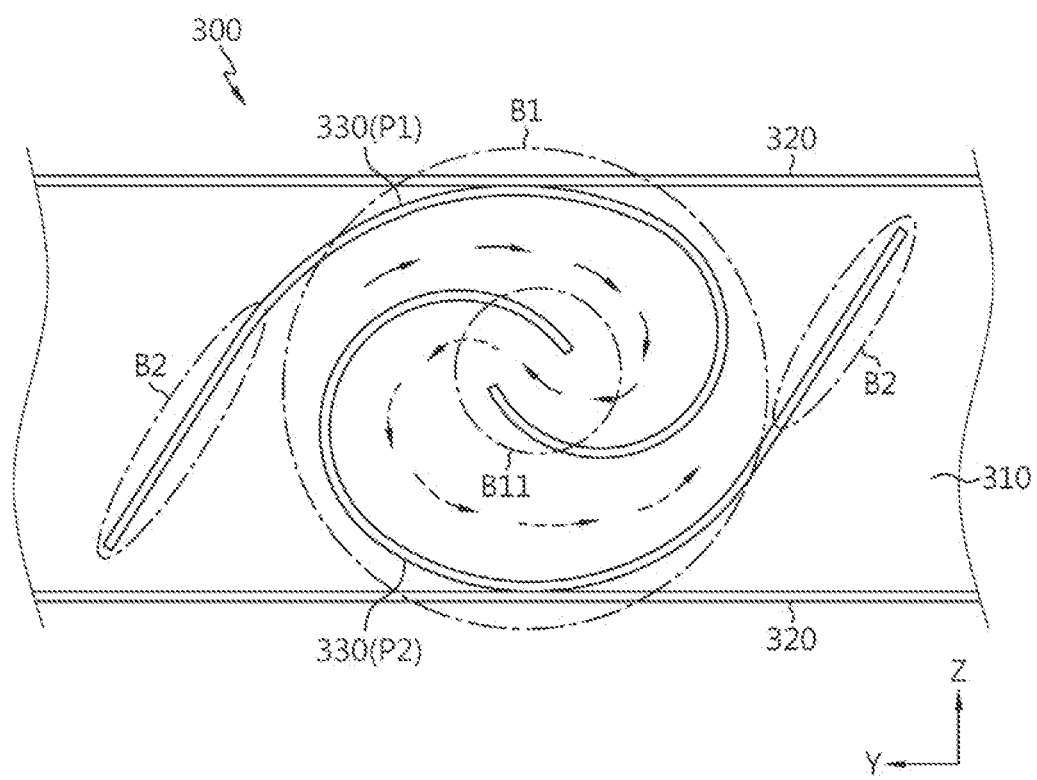
FIG. 9 is an enlarged view illustrating a portion A5 of FIG. 3, viewed from a side.

FIG. 9 is an enlarged view illustrating a portion A5 of FIG. 3, viewed from a side.

Referring to FIG. 9, the protrusion path 330 may be formed in a band shape that extends long, and at least a portion of the protrusion path 330 may be bent. In particular, the venting unit 300 may include a plurality of protrusion paths 330 that are separated from each other. For example, the venting unit 300 may include at least two protrusion paths 330, that is, unit paths P1 and P2, protruding from the main body 310 toward the module case 200, as shown in FIG. 9. All or some of the plurality of protrusion paths 330 may be formed so that at least a portion (e.g., B1) is bent in a curved shape as shown in FIG. 9. In this case, through a configuration of the protrusion path 330 that is bent in a curved shape, a flow path of venting gas may be formed in a curved shape.

According to this embodiment of the present disclosure, venting gas may be smoothly discharged in a defined space that is the venting unit 300 and a path of the venting gas may be as long as possible. Accordingly, a temperature of the venting gas may be lowered and a spark or flame may be more effectively prevented from being discharged. Also, in this case, even when oxygen is introduced through the venting gas from the outside, an inflow path of the oxygen may be long, and thus, the oxygen may be prevented from reaching the inside of the module case 200 as much as possible.

In particular, the protrusion path 330 may include a spiral part. The spiral part may refer to a portion that is bent in a spiral shape. For example, two protrusion paths 330 denoted by P1 and P2 may be formed in a band shape that extends long in one direction, and may have a portion (e.g., B1) extending in a spiral shape. As such, a portion extending in a spiral shape may be referred to as a spiral part.

According to this configuration of the present disclosure, due to the spiral part, venting gas may rotate in a circular shape, in particular, a spiral shape. In this case, the venting gas may be bent at an angle greater than 180°. Accordingly, according to this embodiment, a flow path of venting gas in a certain space may be further increased. In addition, in this case, as the venting gas rotates, a centrifugal force may be generated, and thus, a flame or active material particles may be more effectively prevented from being discharged to the outside.

Furthermore, the protrusion path 330 may include two spiral parts in which at least a portion is inserted. For example, referring to FIG. 9, the first path P1 and the second path P2 may respectively include spiral parts. The center of the spiral part of the first path P1 and the center of the spiral part of the second path P2 may be engaged with each other as in shown in B11.

Two different protrusion paths 330, that is, the first path P1 and the second path P2, may be configured so that rotation directions of venting gas due to spiral parts are opposite to each other. For example, referring to a configuration of FIG. 9, first, due to the spiral part of the first path P1, venting gas may rotate in a clockwise direction (marked by a solid arrow). Venting gas from the center of the spiral part of the first path P1 may be introduced into the center of the spiral part of the second path P2. In this case, the venting gas may be introduced between a central end of the spiral part of the first path P1 and a central end of the spiral part of the second path P2. The venting gas introduced into the spiral part of the second path P2 may rotate in a counterclockwise direction according to a shape of the spiral part of the second path P2 (marked by a dashed arrow).

In this case, a rotation direction of the venting gas may be switched from the clockwise direction to the counterclockwise direction. Furthermore, a direction of the venting gas may be switched at the centers of the spiral parts of two different protrusion paths 330. Accordingly, according to this embodiment, a flow path of venting gas may be increased, and a flame or spark included in the venting gas may be more effectively prevented from being discharged to the outside.

Figure 10:
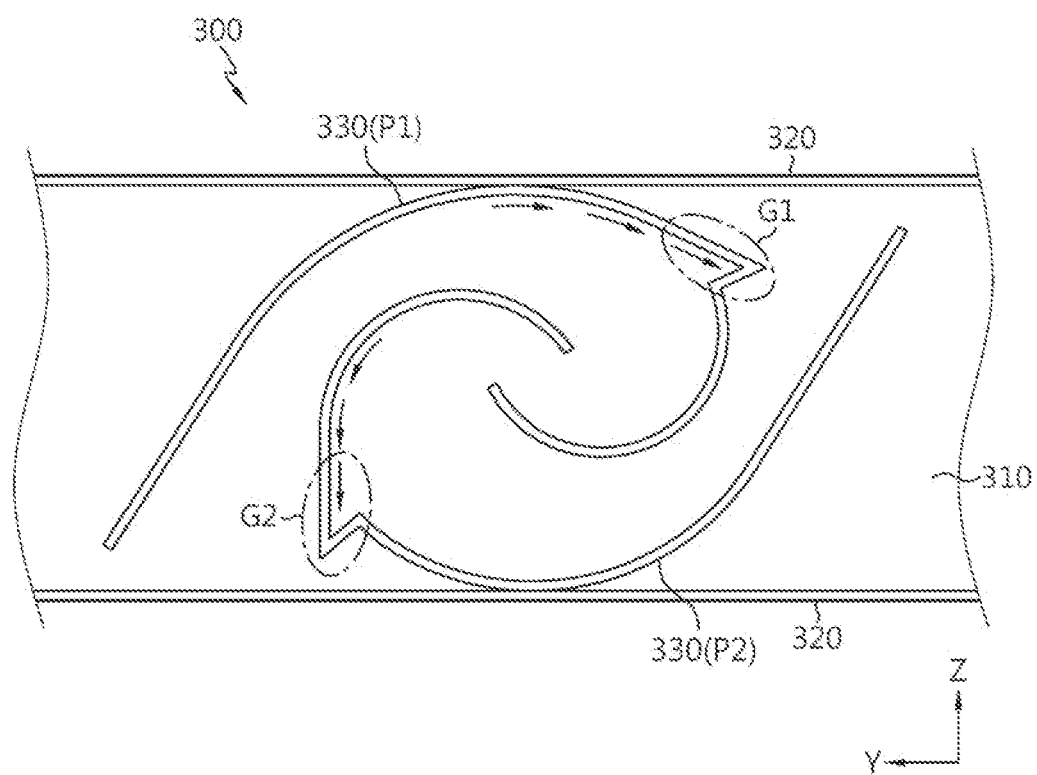
FIG. 10 is a view schematically illustrating elements of a venting unit, according to another embodiment of the present disclosure.

FIG. 10 is a view schematically illustrating elements of the venting unit 300, according to another embodiment of the present disclosure. FIG. 10 may be a modification of a configuration of FIG. 9.

Referring to FIG. 10, the protrusion paths 330 may include spiral parts, and concave portions G1 and G2 may be formed in the spiral parts. In particular, the concave portion may be concave outward more than other portions in a spiral shape. Here, an outer side may refer to a side away from the center of a spiral shape. In particular, when a configuration of FIG. 10 is compared with that of FIG. 9, in FIG. 10, the concave portions G1 and G2 may be more concave outward than a spiral shape of FIG. 9. In more detail, the concave portion G1 of the first path P1 may be concave rightward. The concave portion G2 of the second path P2 may be concave leftward.

According to this embodiment of the present disclosure, through the concave portions G1 and G2 formed in the spiral parts of the protrusion paths 330, particles such as an active material included in venting gas may be more effectively prevented from being discharged. Furthermore, in the spiral parts of the protrusion paths 330, particles such as an active material may be likely to flow into the concave portions G1 and G2 as marked by arrows due to a centrifugal force. Accordingly, according to this embodiment, particles such as an active material may be more reliably prevented from being discharged to the outside and acting as a heat source to cause propagation of thermal runaway or the like.

In particular, in the embodiment, the concave portion may be deeper in a rotation direction of venting gas. For example, in the concave portion G1 of the first path P1 in the configuration of FIG. 10, a depth may increase in a clockwise direction that is a rotation direction of venting gas. Also, in the concave portion G2 of the second path P2 in the configuration of FIG. 10, a depth may increase in a counterclockwise direction that is a rotation direction of venting gas.

According to this embodiment, particle collection effect by the concave portions G1 and G2 may be further improved. In particular, when the concave portions G1 and G2 are formed in the spiral parts of the protrusion paths 330, particle collection effect by the concave portions G1 and G2 may be further improved due to a centrifugal force by the spiral parts. That is, when venting gas rotates through the spiral parts of the protrusion paths 330, particles such as an active material tend to move along inner surfaces of the spiral parts of the protrusion paths 330 due to a rotational centrifugal force of the venting gas. In this case, according to the embodiment, particles such as an active material may be introduced into the concave portions G1 and G2 located in the inner surfaces of the protrusion paths 330. The particles introduced into the concave portions G1 and G2 may be difficult to be discharged to the outside of the concave portions G1 and G2.

Figure 11:
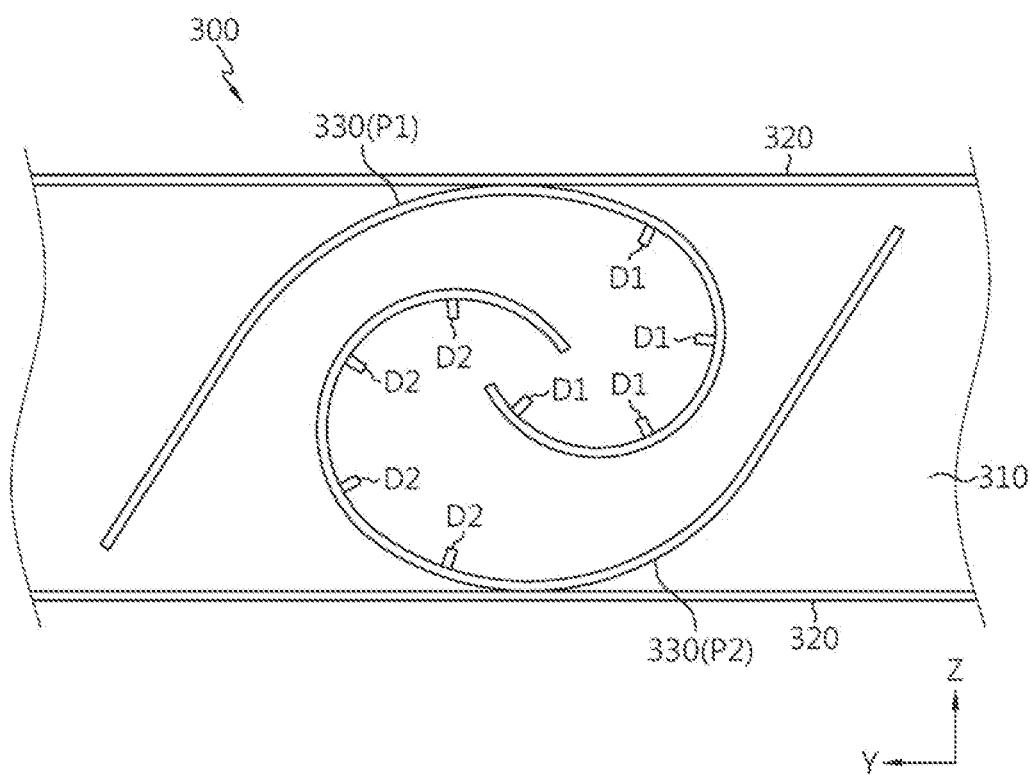
FIG. 11 is a view schematically illustrating elements of a venting unit, according to still another embodiment of the present disclosure.

FIG. 11 is a view schematically illustrating elements of the venting unit 300, according to still another embodiment of the present disclosure. FIG. 11 may be a modification of a configuration of FIG. 9.

Referring to FIG. 11, the protrusion paths 330 may include protrusions D1 and D2 on surfaces. In particular, the protrusions D1 and D2 may be located on inner surfaces of spiral parts. Furthermore, the protrusions D1 and D2 may protrude from a portion where venting gas rotates in a spiral shape toward a portion where the venting gas flows. That is, the protrusions D1 and D2 may protrude toward the center of the spiral shape.

Also, a plurality of protrusions D1 of the protrusion path 330 may be provided on one unit path and a plurality of protrusions D2 may be provided on one unit path. For example, as shown in FIG. 11, a plurality of protrusions D1 may be formed inside the spiral part of the first path P1, and a plurality of protrusions D2 may be formed inside the spiral part of the second path P2.

According to this embodiment of the present disclosure, due to the protrusions D1 and D2 formed on the protrusion paths 330, movement of particles such as an active material or a spark included in venting gas may be more effectively suppressed. In particular, when the protrusion path 330 is formed in a spiral shape, particles such as an active material included in venting gas may be located on an inner surface of the protrusion path 330 due to a rotational centrifugal force. Accordingly, the protrusions D1 and D2 formed on the inner surfaces of the protrusion paths 330 may more reliably suppress movement of particles such as an active material or a flame. Hence, in this case, filtering effect of an active material or a flame by the venting unit may be further improved.

Also, the protrusion path 330 may further include a straight part. The straight part that is an element distinguished from the spiral part described above may be a portion (e.g., B2) of the protrusion path 330 that extends straight, as shown in FIG. 9. In particular, when the protrusion path 330 includes two unit paths, for example, the first path P1 and the second path P2, each of the unit paths P1 and P2 may include a straight part together with a spiral part. In more detail, the first path P1 may include a straight part B2 and a spiral part B1, and thus, venting gas may flow in a straight shape along a surface of the straight part B2 and then may flow in a spiral shape along a surface of the spiral part B1. The second path P2 may include the spiral part B1 and the straight part B2, and thus, venting gas may flow in a spiral shape along a surface of the spiral part B1 and then may flow in a straight shape along a surface of the straight part B2.

In this case, a flow shape of venting gas may be changed in various ways, by the spiral part B1 and the straight part B2 provided in the protrusion path 330. Accordingly, a flame or spark or particles such as an active material may be more effectively prevented from being discharged to the outside. The concave portions G1 and G2 or the protrusions D1 and D2 may be provided in both the spiral part B1 and the straight part B2, not only in the spiral part.

The venting unit 300 may be located on side surfaces of the module case 200, for example, a left surface and a right surface of the module case 200, as shown in FIGS. 1 and 2. In this case, the protrusion path 330 may be configured so that venting gas at least partially flows downward.

For example, referring to a configuration of FIG. 9, the protrusion path 330 may be configured so that venting gas flows downward, at a left portion of the straight part B2 of the first path P1. Also, the protrusion path 330 may be configured so that venting gas moves downward along the spiral parts B1 of the first path P1 and the second path P2. The protrusion path 330 may be configured so that venting gas moves downward at a right portion of the straight part B2 of the second path P2.

According to this configuration of the present disclosure, a flame or high-temperature gas or material may be more effectively prevented from being discharged to the outside. In particular, a flame or high-temperature gas may tend to move upward. In this case, as in this embodiment, when the venting unit 300 is configured so that venting gas moves downward in the venting unit 300, movement of a flame or a high-temperature material may be more reliably suppressed.

Also, the venting unit 300 may be configured so that venting gas flows backward. A backward direction may be a direction opposite to a direction from the venting hole H1 toward the outlet O1. For example, in the embodiment of FIG. 3, a direction from the venting hole H1 to the outlet O1 may be the −Y axis direction (frontward). In this case, the venting unit 300 may be configured so that venting gas flows in the +Y axis direction (rearward), through a configuration of the protrusion path 330. As such, because a portion where venting gas flows in a direction opposite to an overall flow direction of the venting gas is provided in the venting unit 300, a discharge path of venting gas and an inflow path of oxygen may be long. Also, in this case, because an eddy or the like may be formed while venting gas flows, active material particles or a flame included in the venting gas may be more effectively prevented from being discharged to the outside.

Figure 12:
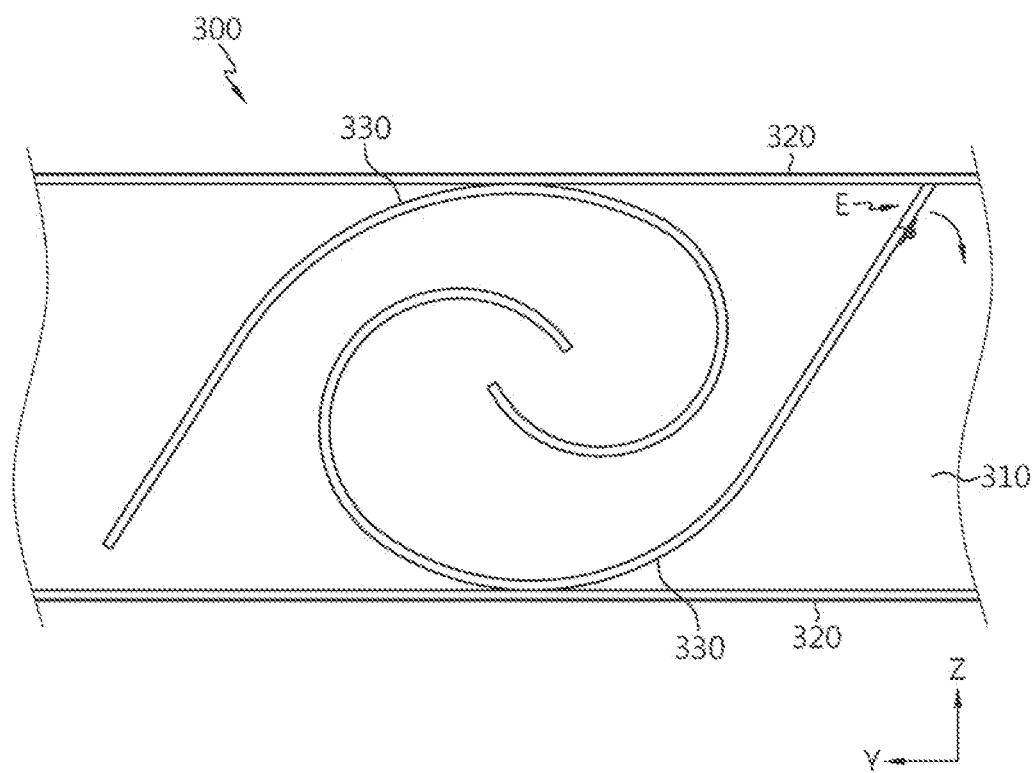
FIGS. 12 and 13 are views schematically illustrating elements of a venting unit, according to still another embodiment of the present disclosure.
Figure 13:
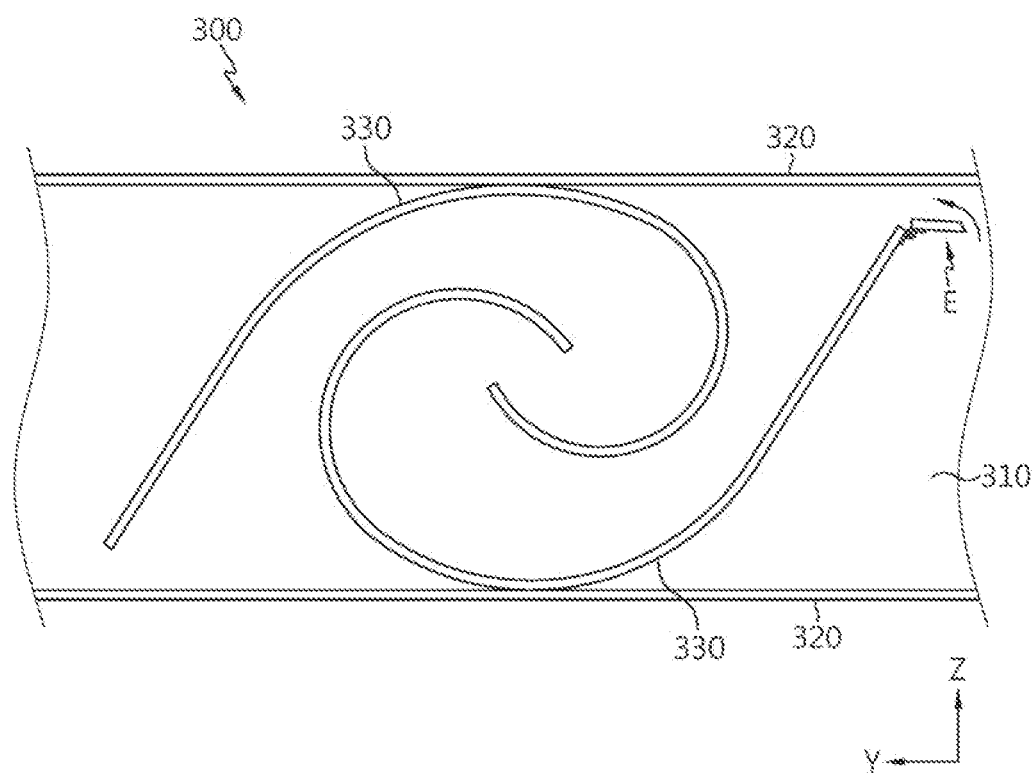

FIGS. 12 and 13 are views schematically illustrating elements of the venting unit 300, according to still another embodiment of the present disclosure.

Referring to FIGS. 12 and 13, the protrusion path 330 of the venting unit 300 may be configured to open and close a venting path. In more detail, the protrusion path 330 may include an opening/closing member E. The opening/closing member E may be configured to allow or block a flow of venting gas, in the venting unit 300. For example, the opening/closing member E may be located at an end of a straight part, to open or close the venting path.

In particular, the opening/closing member E may be pivotable about a hinge. First, the opening/closing member E may be closed to block the venting path in a normal state, as shown in FIG. 12. An elastic body such as a spring may be provided on a hinge portion of the opening/closing member E. The opening/closing member E may be maintained in a closed state due to an elastic force of the elastic body, as shown in FIG. 12.

When gas is generated and discharged from the cell assembly 100 and thus, pressure in the venting unit 300 is increased, pressure on an inner portion (left portion of FIG. 12) of the opening/closing member E may also be increased. Here, an inner side may refer to a side through which venting gas is introduced. When the pressure exceeds a certain level, the opening/closing member E may rotate as marked by an arrow of FIG. 12. The opening/closing member E may be changed to an open state, as shown in FIG. 13. In this case, venting gas inside the opening/closing member E may flow outward (−Y axis direction).

When the venting gas is discharged and pressure inside the opening/closing member E is reduced to a certain level or less, the opening/closing member E may rotate in a counterclockwise direction as marked by an arrow of FIG. 13 due to an elastic force of the elastic body. Then, the opening/closing member E may be maintained in the state as shown in FIG. 12 again, to close the venting path. Furthermore, in this configuration, even when pressure outside the opening/closing member E is increased to a certain level or more, the opening/closing member E may be maintained in the closed state as shown in FIG. 12 without being opened. For example, in the embodiment of FIG. 12, even when pressure outside the opening/closing member E is high, the opening/closing member E may no longer rotate in the counterclockwise direction.

According to this embodiment of the present disclosure, when venting gas is introduced into the venting unit 300, the venting gas may be smoothly discharged, and when the venting gas is almost completely discharged, the venting path may be blocked. Accordingly, oxygen may be more reliably prevented from being introduced backward through the venting path. Hence, a fire may be more effectively prevented from occurring or growing in the module case 200.

Figure 14:
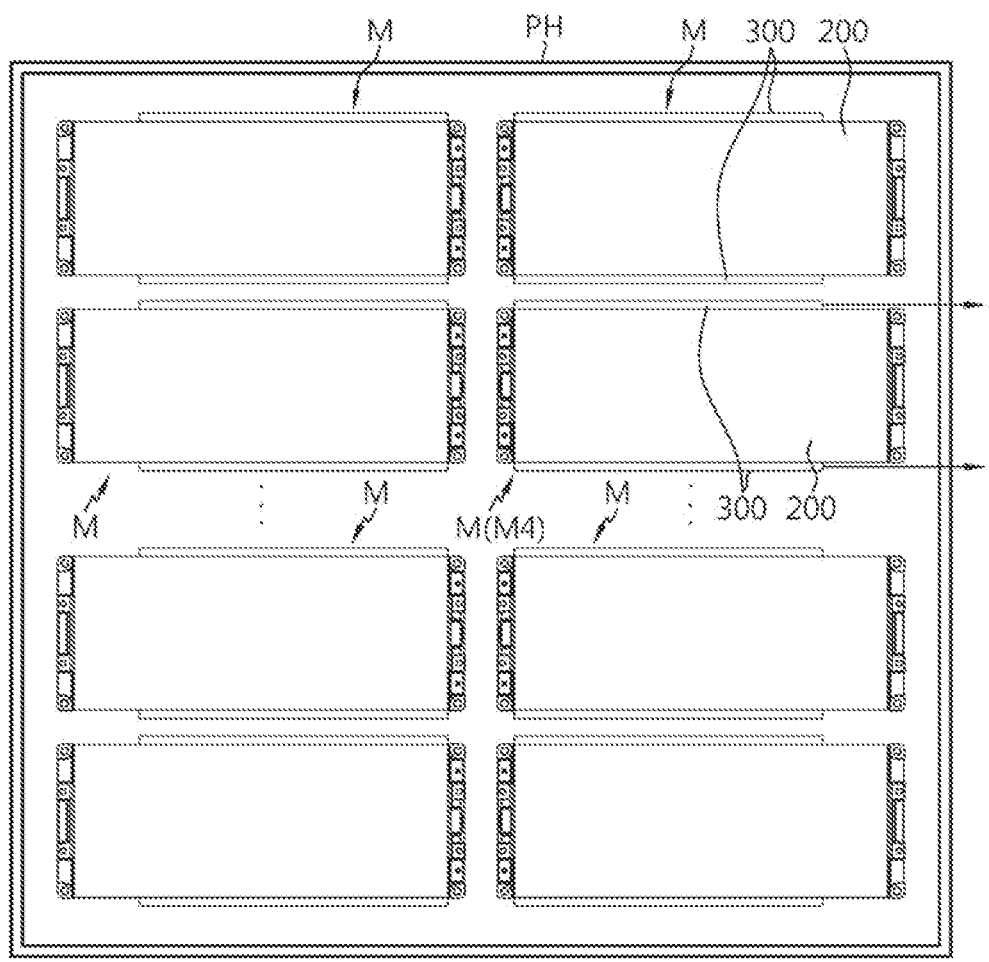
FIG. 14 is a view schematically illustrating a battery pack, viewed from above, according to an embodiment of the present disclosure.

FIG. 14 is a view schematically illustrating a battery pack, viewed from above, according to an embodiment of the present disclosure. Even in the present embodiment, for parts to which descriptions of the above embodiments are equally or similarly applicable, descriptions thereof are omitted.

Referring to FIG. 14, a battery pack according to the present disclosure may include one or more battery modules M according to the present disclosure. In particular, to increase capacity and/or output, the battery pack according to the present disclosure may include a plurality of battery modules M according to the present disclosure. In this case, the above-described configurations may be applied to each battery module M. For example, each battery module M includes the cell assembly 100, the module case 200, and the venting unit 300. The plurality of battery modules M may be accommodated in a pack housing PH.

In the battery pack according to the present disclosure, even when a thermal event occurs in a specific battery module, safety above a certain level may be ensured. In particular, the battery modules M included in the battery pack according to the present disclosure may include the venting unit 300 through which venting gas may be discharged as marked by an arrow. Accordingly, because factors that may cause firing such as a spark, electrode discharged material, and carbide are not included as much as possible in the venting gas that is discharged to the outside, firing may be prevented from occurring in other battery modules M as well as around the corresponding battery module M.

In addition, in the battery pack according to the present disclosure, because a venting direction may be controlled through the venting unit 300 included in each battery module, venting gas may not be directly sprayed toward other battery modules. For example, as shown in FIG. 14, when a plurality of battery modules M are arranged in two columns, that is, a left column and a right column, in the pack housing, for the battery modules M of the left column, a spray direction of the venting unit 300 may be a leftward direction, and for the battery modules M of the right column, a spray direction of the venting unit 300 may be a rightward direction. In this case, when venting gas is discharged from a specific battery module, for example, M4, the venting gas may not be directed toward other battery modules, and thus, a thermal event may be more effectively prevented from spreading to other battery modules due to the venting gas.

Also, although not shown, the battery pack according to the present disclosure may further include various elements of a battery pack well known at the time of filing the present application such as a battery management system (BMS), a bus bar, a relay, and a current sensor, in addition to the battery module M or the pack housing PH.

Also, in the above various embodiments, the venting unit 300 applied to the battery module may also be applied to the battery pack, which will be further described with reference to FIG. 15.

Figure 15:
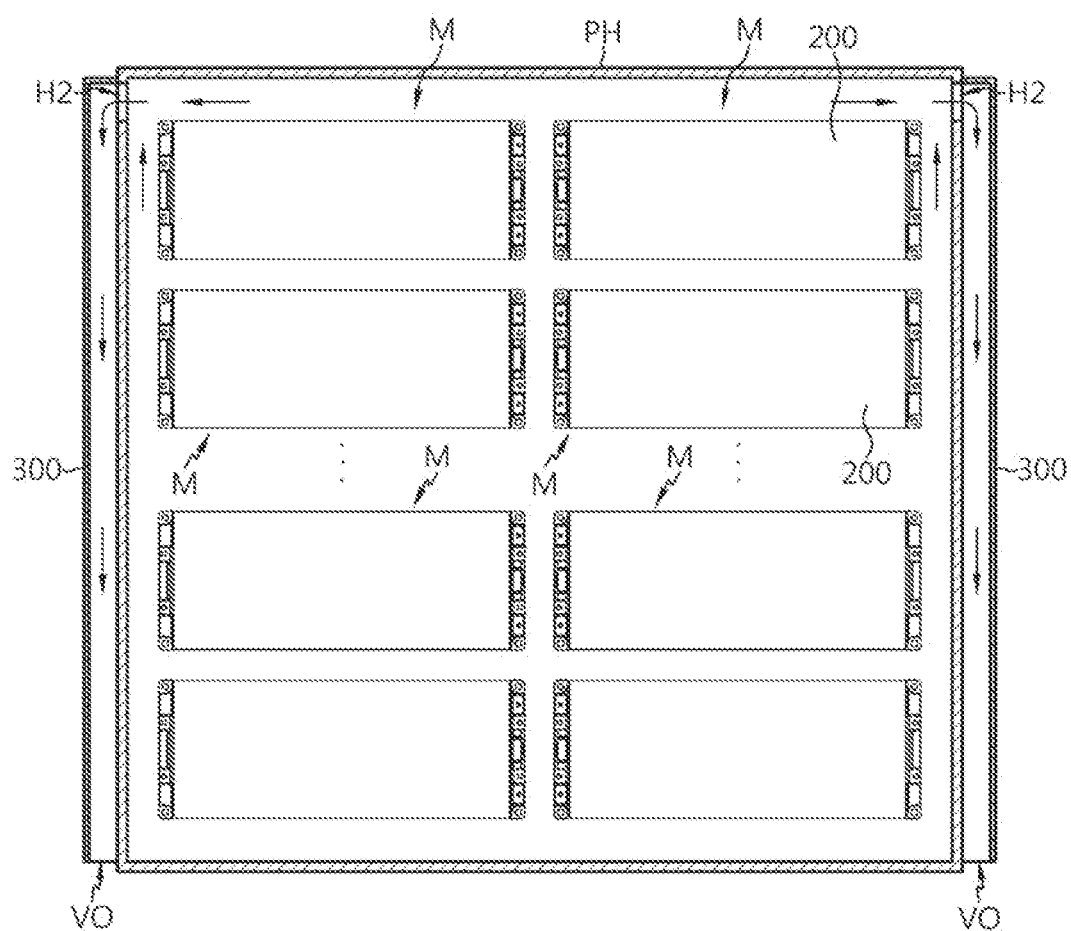
FIG. 15 is a view illustrating a battery pack, viewed from above, according to another embodiment of the present disclosure.

FIG. 15 is a view illustrating a battery pack, viewed from above, according to another embodiment of the present disclosure. For example, FIG. 15 may show elements of a battery pack in a state where an upper side of the pack housing PH is removed, like in FIG. 14. Even in the present embodiment, a difference from the above embodiments will be mainly described.

Referring to FIG. 15, a pack hole H2 may be formed in at least a side of the pack housing PH in which a plurality of battery modules M are accommodated. The pack hole H2 may be formed so that an inner space and an outer space of the pack housing PH communicate with each other. In particular, the pack hole H2 may function as a path through which gas or the like in the inner space of the pack housing PH is discharged to the outside.

In this configuration, the venting unit 300 according to the present disclosure may be mounted on the pack housing PH. In particular, as shown in FIG. 15, when the pack hole H2 is formed in the pack housing PH, the venting unit 300 may be attached to a portion where the pack hole H2 is formed, outside the pack housing PH.

That is, the battery pack according to the embodiment may include one or more battery modules M, the pack housing PH, and the venting unit 300, wherein the pack housing PH has an inner space in which the one or more battery modules M are accommodated and includes the pack hole H2, and the venting unit 300 is mounted on the pack housing PH, includes the venting channel V through which venting gas discharged from the pack hole H2 is introduced and discharged to the outside, and is configured to switch a flow direction of the venting gas in the venting channel V to the opposite direction.

In this case, venting gas or the like generated from an arbitrary battery module M may pass through the pack hole H2 as marked by an arrow of FIG. 15, and may be introduced into the venting unit 300 located outside the pack housing PH. Accordingly, as described above, due to the venting unit 300, a spark, an electrode discharged material, or carbide may be prevented from being discharged to the outside.

As in this embodiment, various configurations of the venting unit 300 mounted on the module case 200 may be applied to the venting unit 300 mounted on the pack housing PH in the same or similar manner.

As shown in FIG. 15, the venting unit 300 may not be included in each battery module M. However, as shown in FIG. 14, the venting unit 300 may be separately attached to each battery module M.

Also, in an embodiment of FIG. 15, the cell assembly 100 is accommodated in the module case 200 and provided in a modular form in the pack housing PH. However, in the battery pack according to another embodiment of the present disclosure, the cell assembly 100 may not be accommodated in the module case 200, but may be directly mounted on the pack housing PH in a cell to pack manner. In this case, the battery module M may include only the cell assembly 100, without including the module case 200. A control device such as a battery management system (BMS) and electronic components such as a relay and a current sensor may be accommodated together in the inner space of the pack housing PH.

The battery module according to the present disclosure or the battery pack according to the present disclosure may be applied to a vehicle such as an electric vehicle or a hybrid vehicle. That is, a vehicle according to the present disclosure may include the battery module according to the present disclosure or the battery pack according to the present disclosure. Also, the vehicle according to the present disclosure may include various other elements included in a vehicle in addition to the battery module or the battery pack. For example, the vehicle according to the present disclosure may further include a vehicle body, a motor, or a control device such as an electronic control unit (ECU) in addition to the battery module according to the present disclosure.

Also, the battery module according to the present disclosure may be applied to an energy storage system (ESS). That is, an ESS according to the present disclosure may include the battery module according to the present disclosure or the battery pack according to the present disclosure.

It will be understood by one of ordinary skill in the art that when terms indicating directions such as upper, lower, left, right, front, and rear are used, these terms are only for convenience of explanation and may vary according to a position of a target object, a position of an observer, etc.

While one or more embodiments of the present disclosure have been described with reference to the embodiments and figures, the present disclosure is not limited thereto, and it will be understood by one of ordinary skill in the art that various changes in form and details may be made therein without departing from the scope of the present disclosure as defined by the following claims.

Description of Reference Numerals 100: cell assembly
200: module case
300: venting unit
310: main body, 320: bent portion, 330: protrusion path
P1: first path, P2: second path
H1: venting hole
O1: outlet
V: venting channel
M: battery module
PH: pack housing
H2: pack hole

What is claimed is:

1. A battery module comprising:
a cell assembly comprising one or more battery cells;
a module case having an inner space in which the cell assembly is accommodated, the module case comprising a venting hole through which venting gas generated from the cell assembly is discharged; and
a venting unit attached to an outer side of the module case, and configured to allow venting gas discharged from the venting hole to be introduced and discharged to an outside and configured to switch a flow direction of the venting gas to an opposite direction,
wherein the venting unit comprises a main body having a plate shape and a bent portion bent from an edge of the main body toward the module case and a protrusion path extending from the main body to the module case,
wherein at least a portion of the protrusion path is bent in a curved shape.

2. The battery module according to claim 1, wherein the venting unit is configured to define a venting channel together with an outer surface of the module case.

3. The battery module according to claim 1, wherein the protrusion path comprises an end that contacts the outer surface of the module case.

4. The battery module according to claim 1, wherein the protrusion path comprises a spiral part in which at least a portion is bent in a spiral shape.

5. The battery module according to claim 4, wherein the protrusion path further comprises a straight part.

6. The battery module according to claim 1, wherein the protrusion path comprises two spiral parts which overlap each other in a first direction and a second direction.

7. The battery module according to claim 1, wherein the venting unit is located on a side surface of the module case,
wherein the protrusion path is configured so that the venting gas at least partially flows downward.

8. The battery module according to claim 1, wherein the protrusion path is configured to open and close a venting path.

9. A battery pack comprising the battery module according to claim 1.

10. A vehicle comprising the battery module according to claim 1.

11. A battery pack comprising:
one or more battery modules;
a pack housing having an inner space in which the one or more battery modules are accommodated, the pack housing comprising a pack hole; and
a venting unit mounted on the pack housing, comprising a venting channel through which venting gas discharged from the pack hole is introduced and discharged to an outside, and configured to switch a flow direction of the venting gas in the venting channel to an opposite direction,
wherein the venting unit comprises a main body having a plate shape and a bent portion bent from an edge of the main body toward the pack housing and a protrusion path extending from the main body to the pack housing, and
wherein at least a portion of the protrusion path is bent in a curved shape.

* * * * *